Figure 1:
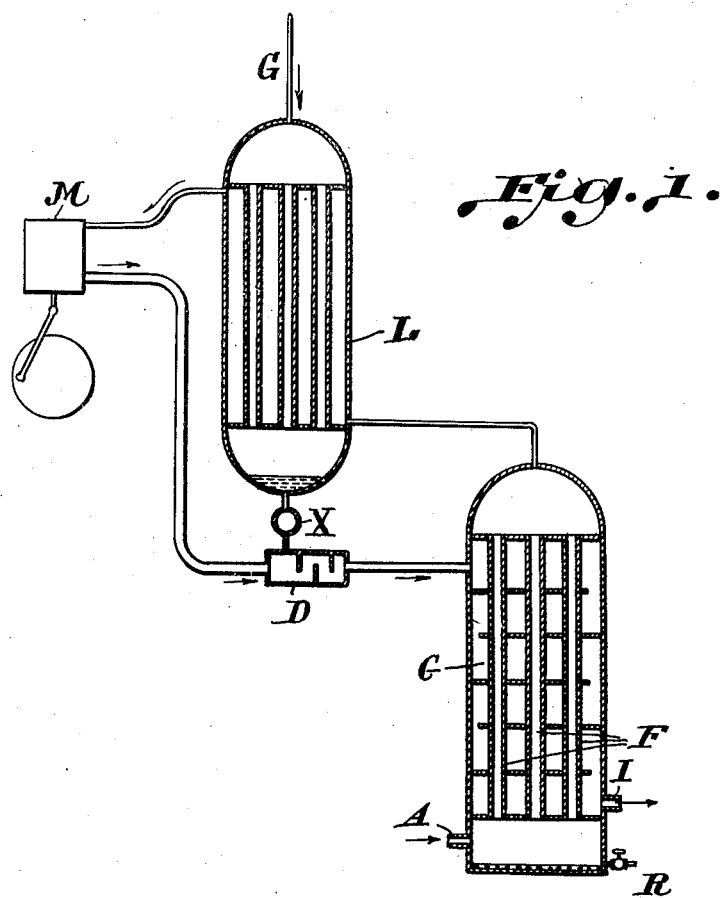

Dec. 18, 1934.  G. CLAUDE ET AL  1,984,463
SEPARATION OF GASEOUS MIXTURES
Original Filed July 16, 1925  2 Sheets—Sheet 1

Inventors,
Georges Claude
and Jean Le Rouge,
By Emil Bonnelyche Atty.

Dec. 18, 1934.   G. CLAUDE ET AL   1,984,463
SEPARATION OF GASEOUS MIXTURES
Original Filed July 16, 1925   2 Sheets-Sheet 2

Inventors
Georges Claude
and Jean Le Rouge,
By Emil Bonnelycke Atty.

Patented Dec. 18, 1934

1,984,463

UNITED STATES PATENT OFFICE 1,984,463

SEPARATION OF GASEOUS MIXTURES

Georges Claude and Jean Le Rouge, Paris, France, assignors to l'Air Liquide, Societe Anonyme pour l'Etude et l'Exploitation des Procedes Georges Claude, Paris, France Original application July 16, 1925, Serial No. 44,007. Divided and this application April 2, 1931, Serial No. 527,240. In France August 5, 1924

5 Claims. (Cl. 62—175.5)

This invention relates to the purification of hydrogen or other gas liquefying at low temperature, and has special reference to the removal of the residual carbon monoxide and of any residual methane which may still be present in the hydrogen produced by the partial liquefaction of water gas, ordinary illuminating gas, coke oven gas and the like.

This application is a division of our earlier application, Serial No. 44,007, filed July 16, 1925, and which has matured into Patent 1,840,833, granted January 12, 1932.

In effecting the separation by partial liquefaction of the constituents of a gaseous mixture containing hydrogen, the said compressed gaseous mixture is circulated in indirect contact with the liquids formed by the more condensable constituents, whereby the boiling of the said liquids and the simultaneous liquefaction of the aforesaid more condensable constituents in the gaseous mixture are effected. Even after treatment in this manner, however, the residual unliquefied gas is not always free from carbon monoxide nor, possibly, from methane, as wholly as may be desired, and it then becomes necessary to thereafter subject the hydrogen obtained to an additional purification by the action of a still lower temperature.

The object of the present invention is to provide a means for obtaining the very low temperature which is required for effecting the purification of hydrogen or other gas liquefying at low temperature from residual amounts of other gases present in the original gaseous mixture from which the hydrogen or other gas to be purified is obtained by a partial liquefaction treatment.

According to the present invention, in processes for the separation of hydrogen by partial liquefaction of gas mixtures containing the same, such, for example, as water gas, ordinary illuminating gas, coke oven gas and the like, a method for completing the removal from the hydrogen of carbon monoxide and any methane which may still be present therein, so as to improve the purity of the gas obtained by circulating cold gas in indirect contact with the hydrogen containing mixture to be purified, consists in introducing and vaporizing in the cold gas liquid nitrogen so as to lower the temperature. To this end, when the cold gas is hydrogen manufactured by the process, it is expanded and liquid nitrogen is introduced into the expanded hydrogen and allowed to vaporize therein so as to lower the temperature, and thereafter the very cold mixture thus obtained is circulated around the tubular system in which the final condensation of the gases accompanying the hydrogen is effected under pressure.

The method, according to the present invention, is also applicable to the purification of gases other than hydrogen which liquefy at low temperatures so as to remove therefrom one or more gases which are more easily liquefiable, an appropriate liquefied gas, which may be other than liquid nitrogen, according to the circumstances of the case, being used in effecting the purification in a similar manner to that previously referred to, and described in more detail in the following description, for the purification of hydrogen by means of liquid nitrogen.

In order that the invention may be clearly understood, the same will now be described more fully with reference to the accompanying drawings which show in diagrammatic section two forms of apparatus for carrying out the invention.

Referring to Figure 1, the compressed gaseous mixture to be treated, after having previously been subjected to partial liquefaction in a suitable apparatus (not shown) so as to free it from almost its entire content of methane and carbon monoxide, is admitted through an inlet A at the bottom of the partial liquefaction apparatus C whence it passes through the nest of tubes F arranged therein, the liquid produced in the tubes F being withdrawn through the valve R.

The hydrogen which passes out from the tubes F of the partial liquefaction apparatus C, and which contains small amounts of carbon monoxide and, possibly, some methane, is expanded with production of external work in the expansion machine M, the expansion being effected down to a pressure preferably about that of the atmosphere. Before circulating around the exterior of the tubes F of the apparatus C, the expanded hydrogen is passed through a container or collector D, provided with baffles into which liquid nitrogen obtained in the manner hereinafter described is introduced by means of the valve X. The liquid nitrogen, being discharged into an atmosphere rich in hydrogen and poor in nitrogen, itself acquires and efficiently maintains the very low temperature corresponding to its partial pressure which is much lower than atmospheric pressure.

The very cold mixture thus obtained circulates outside the tubes F in the compartment C and, owing to its very low temperature, brings about the condensation of the carbon monoxide, and also of any methane, still present with the hydrogen inside the tubes F. After circulating around the tubes F, the gases leave the compartment C by the outlet I and, after having been partially reheated, if need be, in liquefiers at the expense of the gaseous mixture treated, are admitted to the temperature exchangers, which latter are not shown in the drawings.

Under these conditions, the very low temperature required for the purification of the hydrogen needs no longer be produced by means of the expansion machine itself, which can thus be supplied with hydrogen which is relatively only slightly cold, whereby the efficiency of the expansion in respect to the amount of cooling obtained is considerably enhanced. With this object in view, the compressed hydrogen, upon issuing from the tubes F, can be reheated, for example, by circulating it through the liquefier L, and so at the same time causing the liquefaction of the nitrogen, serving as the purifying agent, which is introduced in the cold condition and under pressure through the inlet G of the liquefier.

Of course, the reheating of the hydrogen prior to its expansion can be increased to a further extent in the usual manner by circulating it in direct contact with the whole or a part of the compressed gaseous mixture to be treated.

Moreover, if the purification of the hydrogen from carbon monoxide and methane is not completed by the method previously described, such purification can be completed by circulating the liquid nitrogen introduced into the collector D in the opposite direction to but in contact with the expanded hydrogen, for example, in a column provided with plates or with small metal tubes of the type termed "Raschig rings". Under the influence of this stream of liquid nitrogen, the carbon monoxide and the methane remaining in the gaseous mixture, being less volatile than the nitrogen, are condensed and replaced by gaseous nitrogen, the presence of which is not undesirable, if the hydrogen is adapted for use in the manufacture of synthetic ammonia. In addition to this nitrogen, which is introduced into the hydrogen in the manner just described, there is also to be taken into account that which may be present in the hydrogen leaving the tubes F.

In this last method of completing the purification, the quantity of liquid nitrogen should be sufficient to still ensure an excess of nitrogen in the washing liquid when it leaves the column, after cooling the hydrogen to the very low temperature of the nitrogen boiling under reduced pressure and after condensation of the carbon monoxide and methane. This liquid is then added to the liquid carbon monoxide discharged into the principal column of the apparatus.

Figure 2:
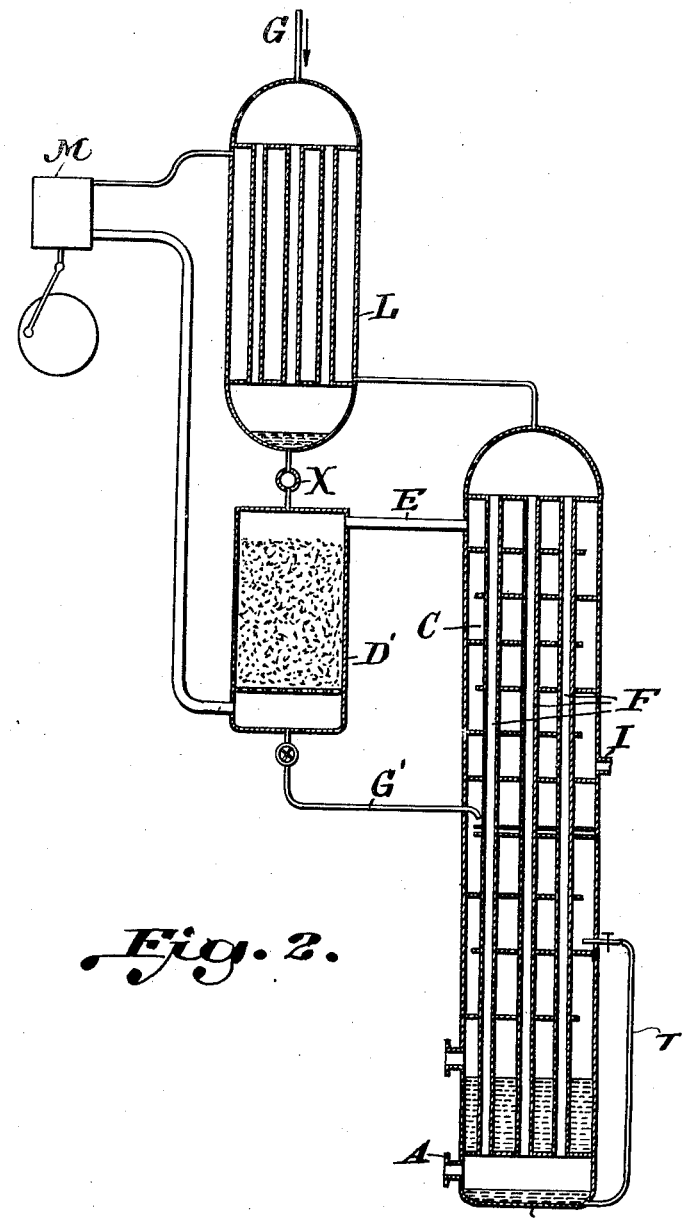

Figure 2 represents an apparatus for carrying out the process thus completed. The compressed and cold gaseous mixture containing, for instance, hydrogen, together with carbon monoxide and nitrogen, arrives at A and ascends the tubes F wherein it partly liquefies. A mixture of liquid nitrogen and carbon monoxide collects at B and is discharged through pipe T to the outside of the lower part of the bundle of tubes to be vaporized in the chamber external to said bundle. The gas obtained at the upper part of the tubes F passes, in the same way as in Figure 1, through liquefier L and then through expansion engine M, after which it is delivered to the lower part of a rectification column D' filled with Raschig rings, which takes the place of the collector D of Figure 1, at the upper part of which column the nitrogen, which has been liquefied in liquefier L, is delivered through the valve X. The cold gaseous mixture thus produced is delivered through pipe E to the chamber C around the upper part of the bundle of tubes F and it leaves through outlet I. The excess liquid arriving at the lower part of column D' is delivered through pipe G' to the chamber C outside of the tubes F.

It will be noted that the calorific capacity of the hydrogen which leaves the tubes F is increased by the whole calorific capacity of the liquid which is introduced into the column D', the addition of the said liquid producing the effect that the mass of gas circulating outside the tubes F of the liquefaction system is greater than if the hydrogen alone were to circulate outside the said tubes. The calorific capacity of the gases circulating outside the tubes F can thus be made equal to or greater than that of the gaseous mixtures circulating in the opposite direction inside the said tubes whereby the efficiency of the condensation is improved.

We claim as our invention:

1. The process of separating hydrogen contained in coal gas which comprises passing the coal gas in heat exchange relation with cold liquefied constituents thereof other than hydrogen, passing the so-cooled gas in confined streams in heat exchange relation with cold liquefied nitrogen, allowing the further cooled gas to expand and thus produce work, and thereafter passing the expanded gas into contact with liquid nitrogen under pressure.

2. A method for the separation of gaseous mixtures, which comprises partially liquefying a compressed gaseous mixture, reheating it by cooling and liquefying a gas, expanding it, upwardly circulating it in direct contact with and in the opposite direction to the aforesaid liquefied gas, removing from the expanded gaseous mixture the liquefied gas resulting from said direct contact, using the resulting gaseous mixture thus obtained for the partial liquefaction of the compressed gaseous mixture.

3. In a process for the separation of hydrogen by partial liquefaction of gaseous mixtures containing the same, the steps of cooling and liquefying nitrogen by the cold of a compressed gas rich in hydrogen resulting from the partial liquefaction, expanding said gas, upwardly circulating it in direct contact with and in the opposite direction to the aforesaid liquid nitrogen, removing from the expanded gas rich in hydrogen the liquid nitrogen resulting from said direct contact, using the resulting gaseous mixture thus obtained for the partial liquefaction of the compressed gaseous mixture.

4. A method for the separation of gaseous mixtures, which comprises partially liquefying a compressed gaseous mixture, reheating it by cooling and liquefying a gas, expanding it, upwardy circulating it in direct contact with and in the opposite direction to the aforesaid liquefied gas, using the resulting liquid and gaseous mixture thus obtained for the partial liquefaction of the compressed gaseous mixture.

5. A method for the separation of gaseous mixtures, which comprises partially liquefying a compressed gaseous mixture, reheating it by cooling and liquefying a gas, expanding it, upwardly circulating it in direct contact with and in the opposite direction to the aforesaid liquefied gas, using the liquid resulting from said direct contact for a preliminary stage of the partial liquefaction of the compressed gaseous mixture, and using the gas resulting from said direct contact for the last stage of the partial liquefaction of the compressed gaseous mixture.

GEORGES CLAUDE.
JEAN LE ROUGE.